United States Patent
Noguchi et al.

(10) Patent No.: US 10,054,755 B2
(45) Date of Patent: Aug. 21, 2018

(54) LENS-FIXING DEVICE, METHOD OF ADJUSTING LENS-FIXING DEVICE, AND LENS-FIXING METHOD

(71) Applicant: OLYMPUS CORPORATION, Hachioji-shi, Tokyo (JP)

(72) Inventors: Junya Noguchi, Tokyo (JP); Mamoru Fujimura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/366,692

(22) Filed: Dec. 1, 2016

(65) Prior Publication Data

US 2017/0082821 A1    Mar. 23, 2017

Related U.S. Application Data

(63) Continuation of application No. PCT/JP2015/070215, filed on Jul. 15, 2015.

(30) Foreign Application Priority Data

Jul. 15, 2014 (JP) .................................. 2014-145117

(51) Int. Cl.
    *G02B 7/00* (2006.01)
    *G02B 7/02* (2006.01)
(52) U.S. Cl.
    CPC ............... *G02B 7/02* (2013.01); *G02B 7/023* (2013.01)
(58) Field of Classification Search
    CPC .................................. G02B 7/02; G02B 7/023
    See application file for complete search history.

(56) References Cited

U.S. PATENT DOCUMENTS

| 5,453,606 A | 9/1995 | Hojo |
| 2007/0121222 A1 | 5/2007 | Watanabe |

FOREIGN PATENT DOCUMENTS

| JP | 06265766 A | 9/1994 |
| JP | 08327870 A | 12/1996 |
| JP | 2007-155761 | * 6/2007 ............... G02B 7/02 |

(Continued)

OTHER PUBLICATIONS

International Search Report (ISR) and Written Opinion dated Oct. 20, 2015 issued in International Application No. PCT/JP2015/070215.

(Continued)

*Primary Examiner* — Joseph P Martinez
(74) *Attorney, Agent, or Firm* — Holtz, Holtz & Volek PC

(57) ABSTRACT

A lens-fixing device, in which thermal caulking is performed on a lens frame to fix a lens to the lens frame, includes: a receiving base on which the lens frame equipped with the lens is disposed; a horn section disposed at a position opposite to the receiving base and pressing and deforming an end section of the lens frame while the lens frame disposed at the receiving base is heated; a moving section moving at least one of the receiving base and the horn section in a direction of an axis for performing the thermal caulking; and a positional adjusting section adjusting relative positions of the receiving base and the horn section in a direction perpendicular to the direction of the axis by moving the at least one of the receiving base and the horn section in the direction perpendicular to the direction of the axis.

4 Claims, 10 Drawing Sheets

(56) References Cited

FOREIGN PATENT DOCUMENTS

| JP | 2007155761 A | | 6/2007 | |
|----|--------------|---|--------|----------|
| JP | 2007-245502 | * | 9/2007 | ............. B29C 65/56 |
| JP | 2007245502 A | | 9/2007 | |
| JP | 4764739 B2 | | 9/2011 | |

OTHER PUBLICATIONS

Japanese Office Action (and English language translation thereof) dated Apr. 3, 2018 issued in counterpart Japanense Application No. 2014-145117.

* cited by examiner

LENS-FIXING DEVICE, METHOD OF ADJUSTING LENS-FIXING DEVICE, AND LENS-FIXING METHOD

This application is a continuation application based on PCT Patent Application No. PCT/JP2015/070215, filed Jul. 15, 2015, whose priority is claimed on Japanese Patent Application No. 2014-145117, filed Jul. 15, 2014. The contents of both the PCT Patent Application and the Japanese Patent Application are incorporated herein by reference.

BACKGROUND OF THE INVENTION

Field of the Invention

The present invention relates to a lens-fixing device, a method of adjusting the lens-fixing device, and a lens-fixing method.

Description of Related Art

In the related art, when a lens is fixed to a lens frame, a method of fixing the lens to the lens frame by deforming a portion of the lens frame using thermal caulking is known. In the lens-fixing method using such thermal caulking, the fixing can be performed in a shorter period of time than in a lens-fixing method using an adhesive. Also, there is an advantage that the lens is easily fixed with predetermined accuracy without being affected by an operator's skill level.

For example, Japanese Patent No. 4764739 discloses a thermal caulking device serving as a lens-fixing device in which such thermal caulking is performed. In the thermal caulking device disclosed in Japanese Patent No. 4764739, a pressurizing member (a horn section) configured to heat and pressurize a lens frame is liftably disposed at an upper portion of the thermal caulking device, and a fixing jig (a receiving base) on which the lens frame is disposed is disposed at a lower portion of the thermal caulking device. In order to perform the thermal caulking on the lens frame using the thermal caulking device, the lens frame is disposed on the fixing jig while the lens is fitted into the lens frame, the heated pressurizing member is lowered, and a load is applied to a caulked section at an end section of the lens frame from the pressurizing surface. Thus, the caulked section of the lens frame is deformed and the lens and the lens frame are integrally formed so that the lens is fixed to the lens frame.

SUMMARY OF THE INVENTION

According to a first aspect of the present invention, a lens-fixing device, in which thermal caulking is performed on a lens frame to fix a lens to the lens frame, includes: a receiving base on which the lens frame equipped with the lens is disposed; a horn section which is disposed at a position opposite to the receiving base, the horn section being configured to press and deform an end section of the lens frame while the lens frame disposed at the receiving base is heated; a moving section configured to move at least one of the receiving base and the horn section in a direction of an axis for performing the thermal caulking; and a positional adjusting section configured to adjust relative positions of the receiving base and the horn section in a direction which is perpendicular to the direction of the axis by moving the at least one of the receiving base and the horn section in the direction which is perpendicular to the direction of the axis.

According to a second aspect of the present invention, the lens-fixing device according to the first aspect of the present invention may further include: a first holding section which is provided at the moving section or the positional adjusting section, the first holding section being configured to position the receiving base in the direction which is perpendicular to the direction of the axis and detachably hold the receiving base; and a second holding section which is provided at the moving section or the positional adjusting section, the second holding section being configured to position the horn section in the direction which is perpendicular to the direction of the axis and detachably hold the horn section.

According to a third aspect of the present invention, a method of adjusting a lens-fixing device, which is configured to fix a lens to a lens frame by moving a horn section in a direction of an axis toward the lens frame which is equipped with the lens disposed at a receiving base and performing thermal caulking on an end section of the lens frame, includes: a first adjustment step of causing a position of a central axis of the horn section and a position of a central axis of the receiving base to be substantially aligned in a direction which is perpendicular to the direction of the axis; an adjustment thermal caulking step of disposing an adjusting lens frame equipped with an adjusting lens at the receiving base of the lens-fixing device after the first adjustment step is performed, moving the horn section in the direction of the axis, and fixing the adjusting lens to the adjusting lens frame by performing thermal caulking on the adjusting lens frame; an adjustment position-determining step of detecting eccentricity of the adjusting lens which is fixed to the adjusting lens frame is detected, and determining relative positions of the receiving base and the horn section in the direction which is perpendicular to the direction of the axis for suppressing the eccentricity in an allowable range; and a second adjustment step of adjusting the relative positions of the receiving base and the horn section in the direction which is perpendicular to the direction of the axis such that the relative positions which are determined in the adjustment position-determining step are accomplished.

According to a fourth aspect of the present invention, a lens-fixing method includes: fixing the lens to the lens frame by performing thermal caulking on the lens frame equipped with the lens using the lens-fixing device in which the relative positions of the receiving base and the horn section in the direction which is perpendicular to the direction of the axis are adjusted in advance by performing the method of adjusting the lens-fixing device according to the third aspect.

DETAILED DESCRIPTION OF THE INVENTION

Figure 1:
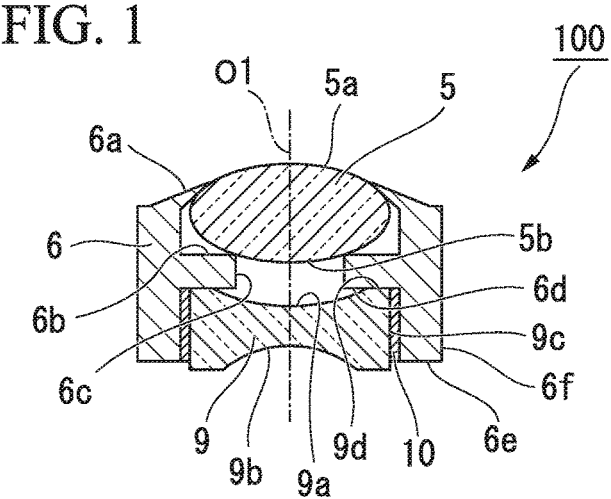
FIG. 1 is a schematic cross-sectional view including an optical axis and showing an example of a lens unit to which a lens is fixed by a lens-fixing device according to a first embodiment of the present invention.

Hereinafter, embodiments of the present invention will be described with reference to the accompanying drawings. In all of the drawings, although the embodiments differ, the same or corresponding members are denoted with the same reference numerals, and common descriptions will be omitted.

(First Embodiment)

A lens-fixing device according to a first embodiment of the present invention will be described.

Figure 2A:
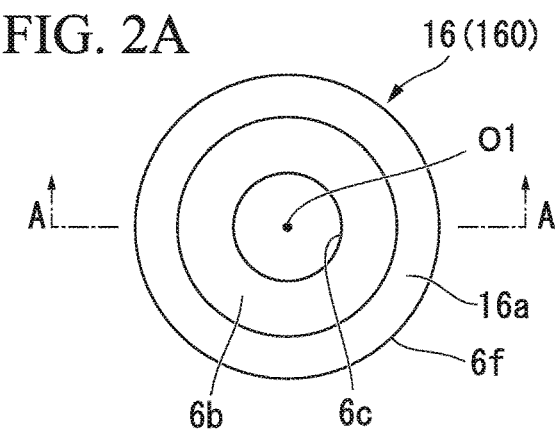
FIG. 2A is a schematic plan view of a lens frame used for the lens-fixing device according to the first embodiment of the present invention.
Figure 2B:
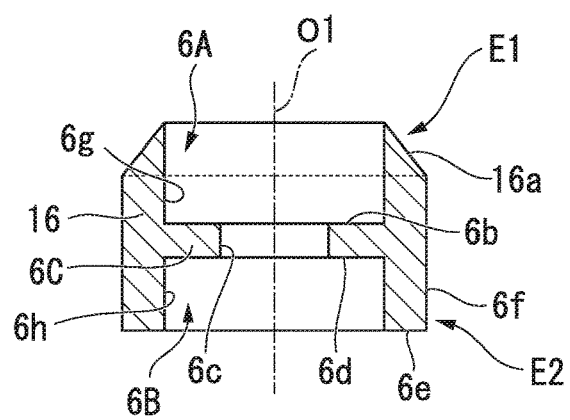
FIG. 2B is a cross-sectional view taken along a line A-A in FIG. 2A.

FIG. 1 is a schematic cross-sectional view including an optical axis and showing an example of a lens unit to which a lens is fixed by the lens-fixing device according to the first embodiment of the present invention. FIG. 2A is a schematic plan view of a lens frame used for the lens-fixing device according to the first embodiment of the present invention. FIG. 2B is a cross-sectional view taken along a line A-A in FIG. 2A.

Figure 3:
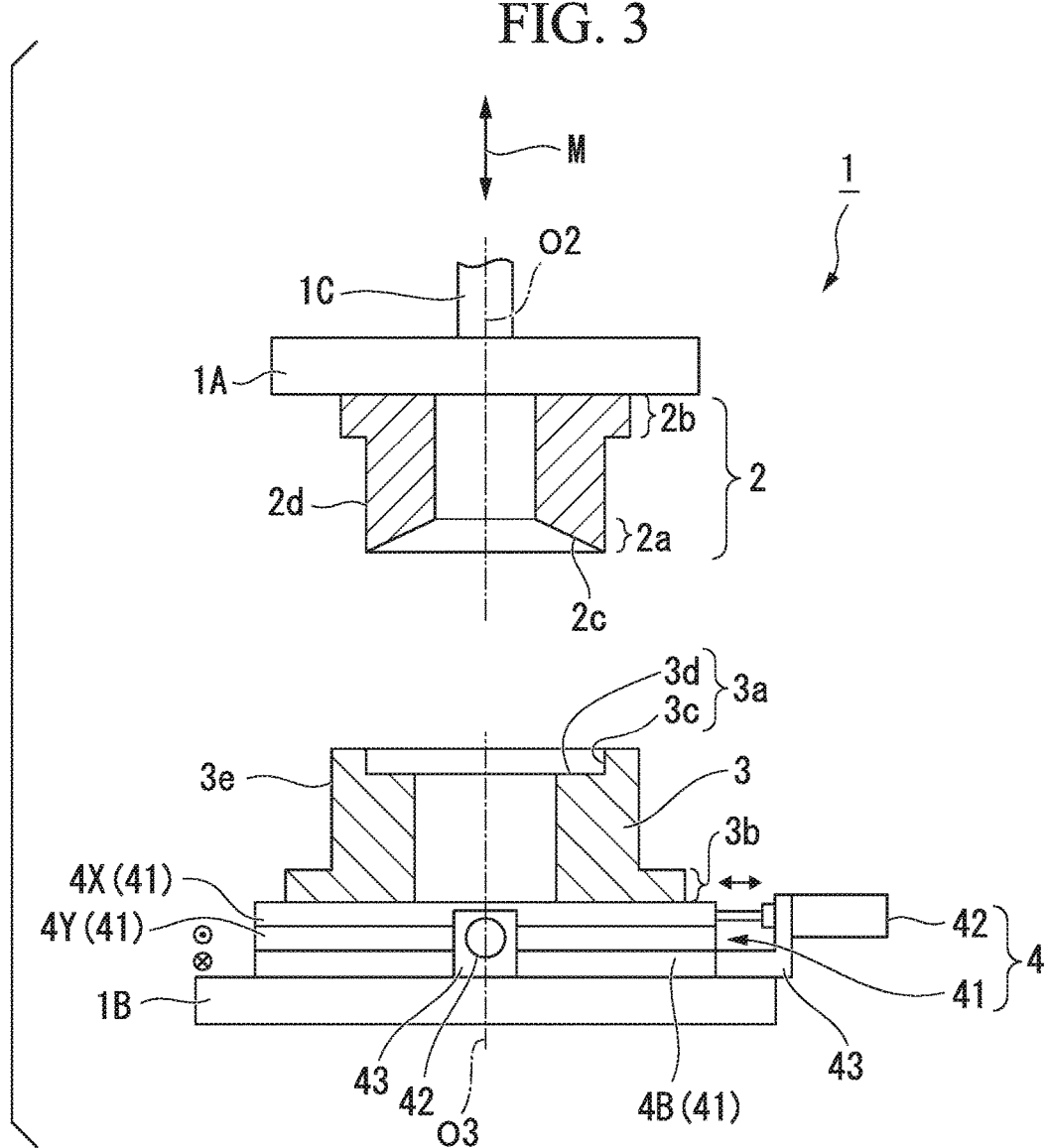
FIG. 3 is a schematic horizontal cross-sectional view showing a constitution of the lens-fixing device according to the first embodiment of the present invention.

FIG. 3 is a schematic horizontal cross-sectional view showing a constitution of the lens-fixing device according to the first embodiment of the present invention.

Note that dimensions or shapes are exaggerated or simplified for the schematic diagrams in the drawings (the same applies to subsequent drawings).

First, a lens unit 100 to which a first lens 5 (a lens) is fixed by being thermally caulked by the lens-fixing device according to this embodiment will be described with reference to FIG. 1.

The lens unit 100 includes the first lens 5, a second lens 9, and a lens frame 6.

The first lens 5 and the second lens 9 are disposed coaxially with each other and are fixed to the lens frame 6. Here, the first lens 5 is fixed by thermally caulking the lens frame 6, and the second lens 9 is fixed using adhesion.

Here, "lens unit" refers to an assembly of a set in which the lenses are fixed to the lens frame. For this reason, the lens unit may be, for example, in a form in which the unit itself constitutes a product like an interchangeable lens, a semi-finished product such as an interchangeable unit that constitutes a portion of a product, or a partial assembly that is generated only in a process of manufacturing a product. For example, in a zoom lens, when a group of moving lenses and a group of fixed lenses are fixed to a lens barrel serving as a separate lens frame, a lens barrel unit including the group of moving lenses and a lens barrel unit including the group of fixed lenses each constitute the lens unit.

In this specification, for example, when relative positions associated with members of a shaft shape, a cylindrical shape, or the like in which axes such as central axes or optical axes of lenses can be specified are described, a direction along an axis is referred to as an axial direction, a direction around the axis is referred to as a circumferential direction, and a direction along a line intersecting the axis in a plane which is perpendicular to the axis is referred to as a radial direction in some cases. Also, particularly, a direction along the optical axis is referred to as an optical axis direction in some cases. In the radial direction, a side that is away from the axis is referred to as a radially outward side (an outside) and a side that is close to the axis is referred to as a radially inward side (an inside) in some cases.

Usage of the lens unit 100 is not particularly limited. The lens unit 100 can be used for appropriate optical devices such as, for example, a capturing lens of a digital camera and lenses that are used for a microscope and an endoscope.

The lens unit 100, which is constituted by the first lens 5 and the second lens 9 which are shown in FIG. 1, is an example. In addition to this, an appropriate lens constitution according to usage thereof can be adopted. For example, the first lens 5 and the second lens 9 can be changed to a joined lens with an appropriate constitution, or one or more lenses or groups of lenses can be added between the first lens 5 and the second lens 9.

At least one lens may be thermally caulked, or all of the lenses may be thermally caulked. Therefore, the second lens 9 can be omitted from the lens unit 100.

The first lens 5 is a double-convex lens which has a first lens surface 5a including a convex surface and a second lens surface 5b including a convex surface.

Surface shapes of the first lens surface 5a and the second lens surface 5b are not particularly limited, and appropriate surface shapes such as, for example, a spherical surface, an aspherical surface, a free curved surface, and a plane can be adopted.

A material of the first lens 5 is not particularly limited as long as the material is a material that withstands heating at a time of thermal caulking, and for example, glass or a heat resistant synthetic resin can be adopted.

A method of manufacturing the first lens 5 is not particularly limited, and an appropriate manufacturing method such as, for example, injection molding, molding, cutting, or polishing can be adopted depending on the material.

In this embodiment, a glass lens obtained by performing polishing on the first lens 5 is adopted as an example of the first lens 5.

A constitution of the second lens 9 is not particularly limited as long as the second lens 9 can constitute an optical system according to the usage of the lens unit 100 together with the first lens 5.

Also, a shape of the second lens 9 is not particularly limited if the second lens 9 can be fixed to the lens frame 6 which will be described below.

In this embodiment, a case in which the second lens 9 includes a double-concave lens which has a first lens surface 9a including a concave surface, a second lens surface 9b including a concave surface, and a lens lateral surface 9c provided between the first lens surface 9a and the second lens surface 9b is described as an example.

The lens lateral surface 9c is formed coaxially with a lens' optical axis of the second lens 9, and the lens lateral surface 9c is formed as a reference surface that is used for performing positional adjustment on the second lens 9 in a radial direction.

An axial reference surface 9d including a plane which is perpendicular to the lens' optical axis of the second lens 9 is formed between the first lens surface 9a and the lens lateral surface 9c at an outer circumferential side of the first lens surface 9a.

A material of the second lens 9 is not particularly limited as long as the material is a material that can be adhered, and for example, glass or a synthetic resin can be adopted.

A method of manufacturing the second lens 9 is not particularly limited, and an appropriate manufacturing method such as, for example, injection molding, molding, cutting, or polishing can be adopted depending on the material.

The lens frame 6 includes a substantially cylindrical member into which the first lens 5 and the second lens 9 are inserted and fixed. An end section of a side of the lens frame 6, into which the first lens 5 is inserted, is thermally caulked so that the lens frame 6 is formed with a caulked section 6a which is folded to come into contact with an outer edge of the first lens surface 5a of the first lens 5.

A lens frame 16 shown in FIG. 2A and FIG. 2B is a member from which the lens frame 6 is formed using thermal caulking and is an original form of the lens frame 6 before the thermal caulking.

The lens frame 16 is a substantially cylindrical member that has a cylindrical outer circumferential surface 6f. An inside of a first end section E1 of the lens frame 16 is formed with a first hole section 6A in which the first lens 5 is disposed. An inside of a second end section E2 which is opposite to the first end section E1 in the axial direction is formed with a second hole section 6B in which the second lens 9 is disposed.

A diameter of a cylindrical inner circumferential surface 6g of the first hole section 6A is larger than an outer diameter of the first lens 5, and the inner circumferential surface 6g is provided coaxially with a central axis O1 of the outer circumferential surface 6f.

An outer circumferential surface in the first end section E1 of the lens frame 16 is formed with a distal end section 16a including a tapered surface, the diameter of which is reduced toward the first end section E1 from the second end section E2 side.

Here, a shape of the distal end section 16a is an example, and the shape of the distal end section 16a is not limited thereto as long as the shape thereof is a shape in which the caulked section 6a can be formed by a horn section 2 which will be described below.

A cylindrical inner circumferential surface 6h of the second hole section 6B is formed to be slightly greater in diameter than the lens lateral surface 9c in order to position the second lens 9 in the radial direction, and is provided coaxially with the central axis O1.

An end surface of the second end section E2 of the lens frame 16 is a proximal end surface 6e including a plane which is perpendicular to the central axis O1.

The proximal end surface 6e is a reference surface in the axial direction with respect to the lens frame 16. For this reason, positions of a first lens receiving section 6b and a second lens receiving section 6d in the axial direction are formed to have a predetermined given value using the proximal end surface 6e as a reference. Thus, the lens frame 16 is configured such that the first lens 5 and the second lens 9 can be disposed at a position based on an optical layout of the lens unit 100.

A bottom section 6C which constitutes hole bottoms of the first hole section 6A and the second hole section 6B is formed in a shape in which a through hole 6c passes through a center of a flat plate which is provided to be perpendicular to the central axis O1 at an intermediate portion in the axial direction of the lens frame 16.

The through hole 6c includes a circular hole of which a diameter is smaller than outer diameters of the first lens 5 and the second lens 9 and is greater than effective lens diameters of the first lens 5 and the second lens 9.

The first lens receiving section 6b serving as a surface of the first end section E1 side in the bottom section 6C receives the second lens surface 5b of the first lens 5 at an inner edge section, an angle of which is formed to intersect the through hole 6c, so that the first lens 5 is configured to be able to be positioned in the axial direction and the radial direction.

The second lens receiving section 6d serving as a surface of the second end section E2 side in the bottom section 6C comes into contact with the axial reference surface 9d of the second lens 9 so that the second lens 9 is configured to be able to be positioned in the axial direction.

A material and a manufacturing method of the lens frame 16 are not particularly limited as long as the distal end section 16a can be thermally caulked. In this embodiment, a molded article made of a synthetic resin using injection molding is adopted as an example of the lens frame 16.

In the lens unit 100, the second lens 9 is inserted into the inner circumferential surface 6h of the lens frame 6 while the first lens surface 9a is in contact with the second lens receiving section 6d. The second lens 9 is fixed to the lens frame 6 via an adhesive cured body 10 formed when an adhesive is cured between the lens lateral surface 9c of the second lens 9 and the inner circumferential surface 6h.

The adhesive used to form the adhesive cured body 10 is not particularly limited as long as the adhesive is an adhesive by which the second lens 9 can be adhered to the lens frame 6. An example of a preferable adhesive used to form the adhesive cured body 10 can include an ultraviolet (UV) curable adhesive, a two-component adhesive, a thermosetting adhesive, or the like.

In the lens unit 100, the second lens surface 5b comes into contact with the inner edge section of the first lens receiving section 6b so that the first lens 5 is fixed by the caulked section 6a in a state in which the first lens 5 is positioned in the axial direction and the radial direction.

In this embodiment, when the first lens 5 is fixed by thermally caulking the lens frame 16, a lens-fixing device 1 according to this embodiment shown in FIG. 3 is used.

The lens-fixing device 1 includes a receiving base 3, the horn section 2, and a positional adjusting mechanism 4 (a positional adjusting section).

The receiving base 3 is a device part on which the lens frame 16 equipped with at least the first lens 5 is mounted. In this embodiment, the receiving base 3 is configured by a substantially cylindrical member which has an outer circumferential surface 3e including a cylindrical surface.

A central axis O3 of the outer circumferential surface 3e is, for example, parallel to a vertical axis. In a central portion of an upper end section of the outer circumferential surface 3e, a disposition hole section 3a, in which the lens frame 16 is detachably disposed, is formed at a position that is coaxial with the central axis O3.

An inner circumferential surface 3c of the disposition hole section 3a is a site which is used to position the lens frame 16 in the radial direction, and includes a cylindrical surface which is slightly greater in diameter than the outer circumferential surface 6f of the lens frame 16. A dimensional difference between an inner diameter of the inner circumferential surface 3c and an outer diameter of the outer circumferential surface 6f is preferably set to be as small as possible, and preferably, for example, 20 μm or less.

A receiving surface 3d which is formed on a hole bottom of the disposition hole section 3a is a site which is used to position the lens frame 16 in the axial direction while being brought into contact with the proximal end surface 6e of the lens frame 16, and by which the lens frame 16, which is pressed from above when the thermal caulking is performed, is supported in the axial direction.

The receiving surface 3d includes a plane that is perpendicular to the central axis O3.

A lower end section of the receiving base 3 is provided with an attachment section 3b, which is configured to fix the receiving base 3 to the positional adjusting mechanism 4, to extend outward in the radial direction. A method of fixing the receiving base 3 to the positional adjusting mechanism 4 in the attachment section 3b is not particularly limited, and for example, bolting, mechanical clamping, or the like can be adopted.

According to the receiving base 3 described above, the lens frame 16 can be disposed in a posture in which the distal end section 16a is directed upward and the central axis O1 of the lens frame 16 and the central axis O3 are set substantially coaxially with each other (including the case in which they are coaxial).

A material of the receiving base 3 is not particularly limited as long as the material is a material on which the thermal caulking is performed while the lens frame 16 is held, and includes, for example, stainless steel, cemented carbides, or the like. In addition, when stainless steel is used, heat treatment may be performed on the stainless steel as necessary.

The horn section 2 is disposed at a position that is opposite to the receiving base 3. The horn section 2 is a member by which the lens frame 16 is pressed and deformed while the lens frame 16, which is disposed at the disposition hole section 3a of the receiving base 3, is heated.

In this embodiment, the horn section 2 is provided with an attachment section 2b that extends in the radial direction at one end section (an end section of an upper end side in the drawing). The horn section 2 is attached to a lower surface of a first attachment section 1A, which is above the receiving base 3 and is movably supported by a moving section 1C which is advanced or retracted in a direction of one axis parallel to the vertical axis, via the attachment section 2b.

A fixing method to the first attachment section 1A in the attachment section 2b is not particularly limited, and for example, bolting, mechanical clamping, or the like can be adopted.

As shown above, since the first attachment section 1A and the horn section 2 are integrally fixed with the moving section 1C, any direction of movement may be expressed as a direction of movement M as long as there is no possibility of misunderstanding.

An inside of a distal end section 2a which is opposite to one end section of the horn section 2 is formed with a tapered pressing surface 2c, a diameter of which is increased downward to bend the distal end section 16a of the lens frame 16 along the first lens surface 5a of the first lens 5.

The pressing surface 2c is formed in a shape which is rotationally symmetrical using a central axis O2, which serves as a central axis of an outer circumferential surface 2d of the horn section 2, as a symmetric axis at an arbitrary angle. Note that the central axis O2 is parallel to a direction of movement M of the moving section 1C.

An example of a shape of the pressing surface 2c can include, for example, a conical surface which has the central axis O2 as a center, a concave curved surface in which an inclination formed by rotating a curved line such as a circular arc that has the central axis O2 as a center is gradually changed in the radial direction, and the like.

Although not shown in the drawings, the horn section 2 is connected to at least one of a heating source and an ultrasonic vibrator to heat a site in the lens frame 16 with which the pressing surface 2c is in contact.

A material of the horn section 2 is not particularly limited as long as the lens frame 16 can be pressed and thermally caulked while being heated, and includes, for example, stainless steel, cemented carbides, and the like. Also, when stainless steel is used, heat treatment may be performed on the stainless steel as necessary.

The positional adjusting mechanism 4 is a device part that moves the receiving base 3 in the directions of two axes that are perpendicular to the central axis O3 so that relative positions are adjusted in a direction that is perpendicular to the direction of movement M.

The positional adjusting mechanism 4 is provided with a stage 41 including an XY stage that is provided to be movable in the directions of the two axes that are perpendicular to the central axis O3 or the like, and a driving section 42 configured to drive the stage 41.

For example, a fixing section 4B, a Y-axis moving section 4Y, and an X-axis moving section 4X are sequentially stacked on the stage 41. Here, the Y-axis moving section 4Y is movably joined to the fixing section 4B in one horizontal direction (a depth direction on a paper surface of the drawing). The X-axis moving section 4X is movably joined to the Y-axis moving section 4Y in a horizontal direction (left and right directions of the drawing) that is perpendicular to a direction of movement of the Y-axis moving section 4Y.

The attachment section 3b of the receiving base 3 is fixed to an upper surface of the X-axis moving section 4X. Also, the fixing section 4B is fixed to a second attachment section 1B serving as a base section of the lens-fixing device 1 fixed to a position which is opposite to the first attachment section 1A.

A constitution of the driving section 42 is not particularly limited, and for example, a micrometer head, a spindle of which is operated in a manual or motor-driving manner, can be adopted.

In the case of the driving section 42, two driving sections 42 are provided to be able to independently drive the Y-axis moving section 4Y and the X-axis moving section 4X with respect to the fixing section 4B.

One of the driving sections 42 is fixed to a lateral surface of the fixing section 4B via a fixture 43 such that a leading spindle configured to transfer a driving force of the driving section 42 comes into contact with a lateral surface of the Y-axis moving section 4Y which is perpendicular to a driving direction of the driving section 42. Also, the other of the driving sections 42 is fixed to the lateral surface of the fixing section 4B via the fixture 43 such that the leading spindle which transfers the driving force of the driving section 42 comes into contact with a lateral surface of the X-axis moving section 4X which is perpendicular to the driving direction of the driving section 42.

The positional adjusting mechanism 4 may be independently produced or a commercially available XY stage may be introduced thereas. An example of the commercially available XY stage includes an XY-axis stainless stage TSDS series manufactured by Sigmakoki Co., Ltd.

Note that, when display resolution of an amount of driving of the driving section 42 is insufficient with respect to necessary positional adjustment accuracy or when the amount of driving is desired to be more effectively read, a driving-amount measuring section (not shown) which measures and displays the amount of driving can also be provided.

An example of the driving-amount measuring section can include, for example, Dial Gauge 2900SB-10 manufactured by Mitutoyo Corporation. According to the driving-amount measuring section, for example, display resolution of about 1 μm can be acquired.

In order to perform a lens-fixing method according to this embodiment using the lens-fixing device 1 having the above-described constitution, a method of adjusting the lens-fixing device according to this embodiment is performed and relative positions between the horn section 2 and the receiving base 3 are adjusted in a direction which is perpendicular to the direction of movement M before the thermal caulking is performed using the first lens 5 and the lens frame 16 which are targets to be fixed.

Thus, first, the method of adjusting the lens-fixing device according to this embodiment will be described.

Figure 4:
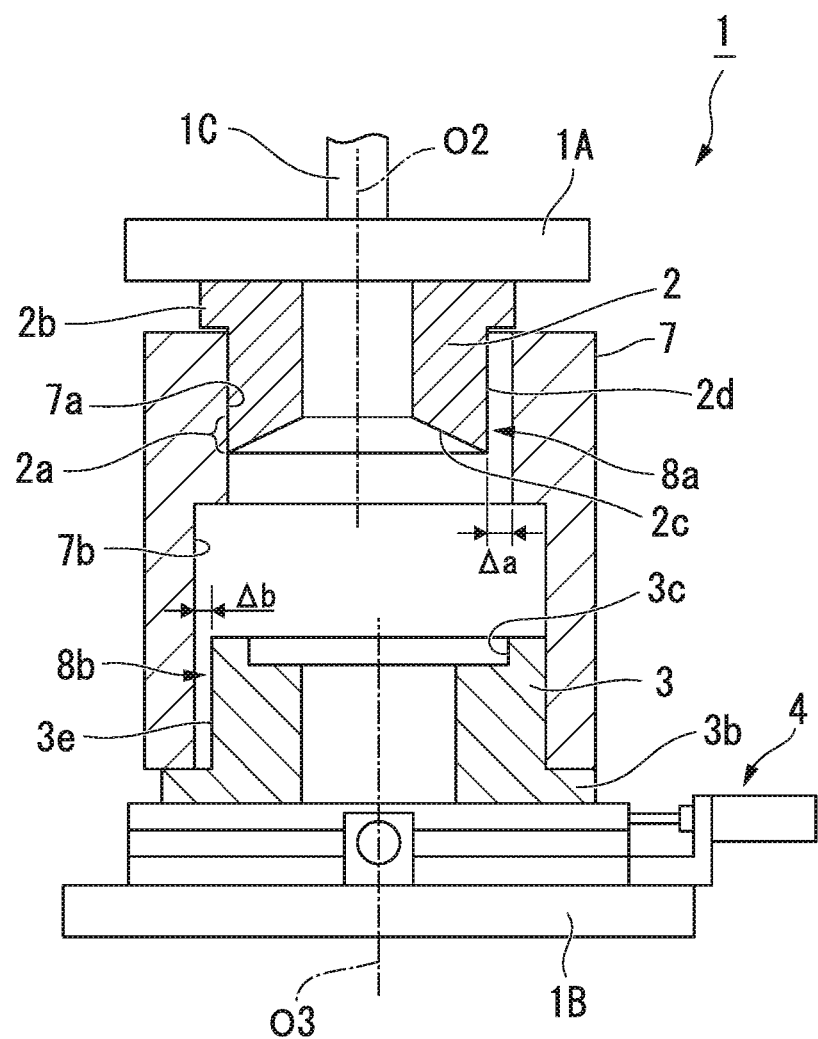
FIG. 4 is a diagram showing a process of a first adjustment step in a method of adjusting the lens-fixing device according to the first embodiment of the present invention.
Figure 5A:
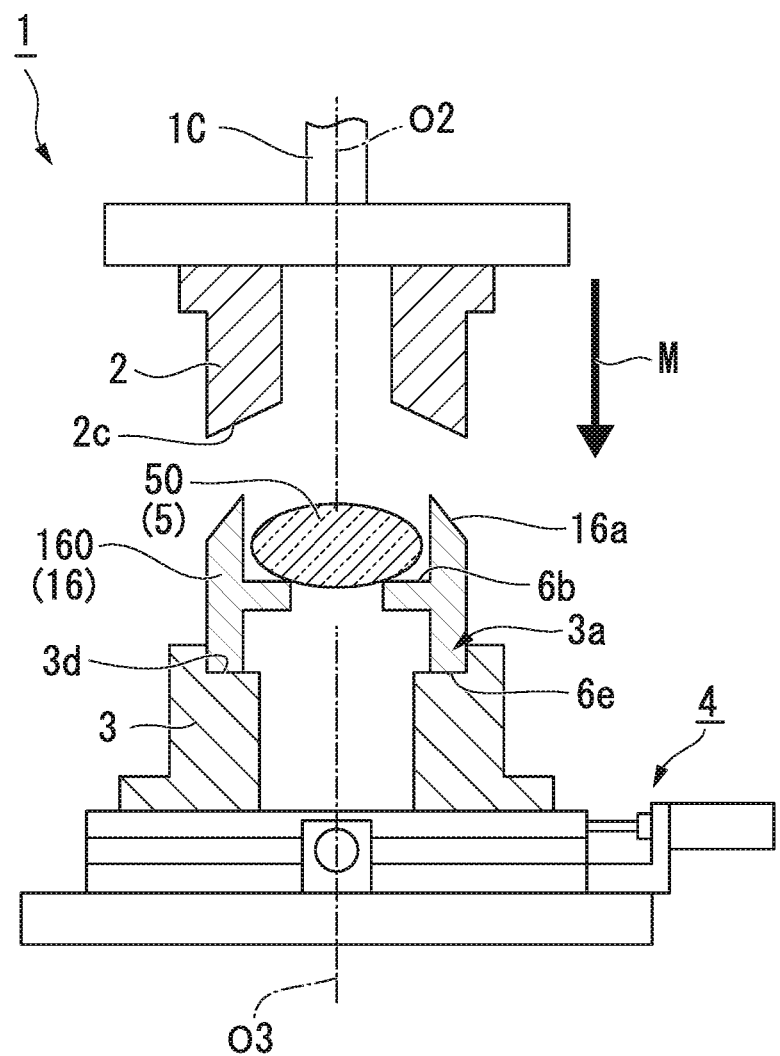
FIG. 5A and FIG. 5B are diagrams showing a process of an adjustment thermal caulking step in the method of adjusting the lens-fixing device according to the first embodiment of the present invention.
Figure 5B:
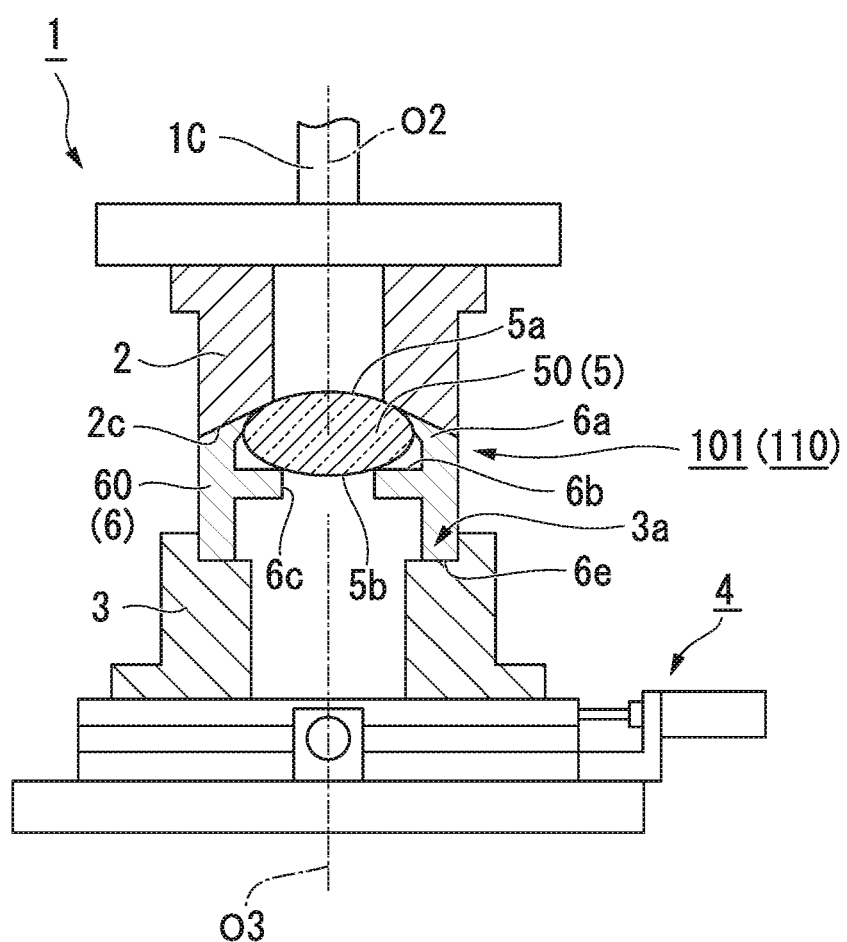
Figure 6:
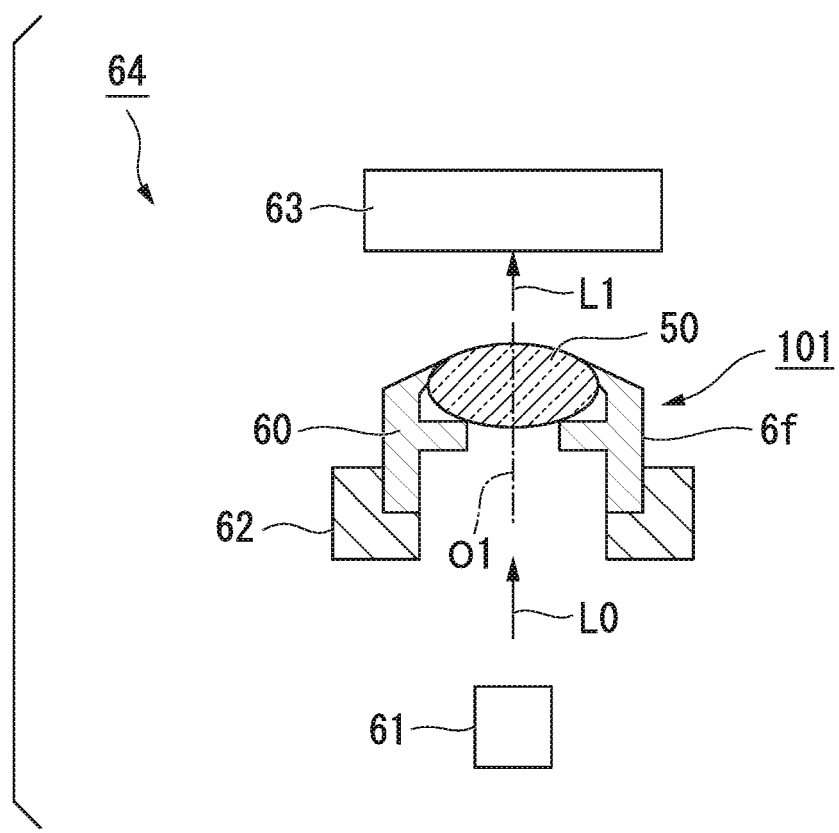
FIG. 6 is a diagram showing a process of an adjustment position-determining step in the method of adjusting the lens-fixing device according to the first embodiment of the present invention.
Figure 7:
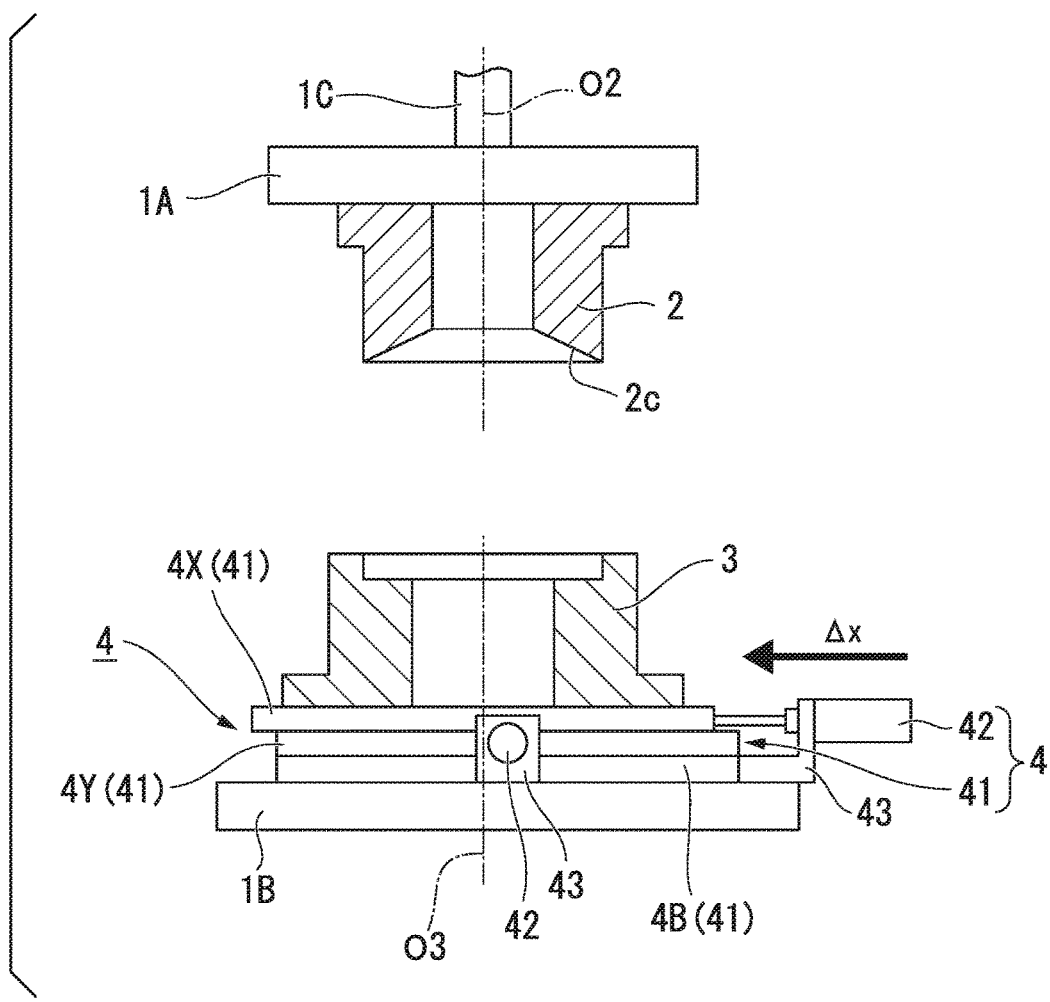
FIG. 7 is a diagram showing a process of a second adjustment step in the method of adjusting the lens-fixing device according to the first embodiment of the present invention.

FIG. 4 is a diagram showing a process of a first adjustment step in the method of adjusting the lens-fixing device according to the first embodiment of the present invention. FIG. 5A and FIG. 5B are diagrams showing a process of an adjustment thermal caulking step in the method of adjusting the lens-fixing device according to the first embodiment of the present invention. FIG. 6 is a diagram showing a process of an adjustment position-determining step in the method of adjusting the lens-fixing device according to the first embodiment of the present invention. FIG. 7 is a diagram showing a process of a second adjustment step in the method of adjusting the lens-fixing device according to the first embodiment of the present invention.

In the lens-fixing device 1, although the horn section 2 and the receiving base 3 face each other, the receiving base 3 is movably supported by the positional adjusting mechanism 4 in the directions of the two axes that are perpendicular to the central axis O3, and therefore the central axis O2 and the central axis O3 do not necessarily need to be aligned.

In order to preferably perform the thermal caulking, the central axes O2 and O3 may be mutually aligned, but precise actual measurement of positions of the central axes O2 and O3 and correction of a relative positional relationship between the central axis O2 and the central axis O3 take a large amount of time.

The lens-fixing device 1 is configured to easily perform positional adjustment of the central axes O2 and O3 by movably holding the receiving base 3 using the positional adjusting mechanism 4 in the directions of the two axes that are perpendicular to the central axis O3.

Here, when there is, for example, a parallelism error between the central axes O2 and O3, a movement error of the moving section 1C, or the like due to a parts error, an assembly error, or the like of the lens-fixing device 1, an optimal movement position is not easily found using the positional adjusting mechanism 4.

Thus, in the method of adjusting the lens-fixing device according to this embodiment, the thermal caulking is performed on an adjusting lens and an adjusting lens frame which have the same constitutions as the first lens 5 and the lens frame 16 which are the targets to be fixed, respectively, and an amount of positional adjustment using the positional adjusting mechanism 4 in which the eccentricity of the adjusting lens is an allowable value or less is determined.

The method of adjusting the lens-fixing device according to this embodiment is a method in which the first adjustment step, the adjustment thermal caulking step, the adjustment position-determining step, and the second adjustment step are sequentially performed.

The first adjustment step is a process in which the positions of the central axis O2 of the horn section 2 and the central axis O3 of the receiving base 3 are caused to be substantially aligned in a direction which is perpendicular to the direction of movement M of the horn section 2 at the time of the thermal caulking.

Here, the expression "caused to be substantially aligned" refers to the aligning of the position of the central axis O2 and the position of the central axis O3 to an extent that the caulked section 6a can be formed over the entire circumference and the first lens 5 can be fixed without floating from the first lens receiving section 6b. Although the positions need not be fully aligned, they may consequently be fully aligned.

To be specific, for example, an amount of positional deviation of the central axes O2 and O3 in the radial direction is preferably aligned to an extent that the amount of positional deviation is 10 μm or less.

A method of substantially aligning the central axes O2 and O3 is not particularly limited, and positional adjustment through fitting using a coaxial adjusting jig 7 is adopted as an example as shown in FIG. 4 in this embodiment.

The coaxial adjusting jig 7 is a cylindrical member, one end section of which is formed with a first fitting section 7a including a cylindrical hole, which is detachably externally fitted to the outer circumferential surface 2d of the horn section 2, and the other end section of which is formed with a second fitting section 7b including a cylindrical hole, which is detachably externally fitted to the outer circumferential surface 3e of the receiving base 3, at a position which is coaxial with the first fitting section 7a.

Hole diameter dimensions of the first fitting section 7a and the second fitting section 7b are determined on the basis of a positional adjustment allowable value which is necessary to substantially align the central axes O2 and O3.

For example, when a maximum value of a gap 8a between the first fitting section 7a and the outer circumferential surface 2d is Δa, and a maximum value of a gap 8b between the second fitting section 7b and the outer circumferential surface 3e is Δb, the amount of positional deviation of the central axes O2 and O3 in the radial direction can be suppressed to (Δa+Δb)/2 or less.

The length of the coaxial adjusting jig 7 is set such that a distance in the axial direction between the horn section 2 and the receiving base 3 is a distance of the axial direction at the time of the thermal caulking in a state in which the first fitting section 7a and the second fitting section 7b are externally fitted to the outer circumferential surfaces 2d and 3e, respectively. Thus, even if the direction of movement M is inclined with respect to the central axis O3, the amount of positional deviation of the pressing surface 2c in the radial direction at the time of the thermal caulking can be suppressed to the given value or less.

In order to perform the positional adjustment on the central axes O2 and O3 using the coaxial adjusting jig 7, first, the horn section 2 is sufficiently spaced apart from the receiving base 3 by driving the moving section 1C and raising the horn section 2.

Also, the second fitting section 7b of the coaxial adjusting jig 7 is directed toward the receiving base 3, the coaxial adjusting jig 7 is disposed above the receiving base 3, the second fitting section 7b is fitted to a distal end section of the receiving base 3, and a lower end section of the coaxial adjusting jig 7 is brought into contact with the attachment section 3b.

Next, the horn section 2 is lowered by driving the moving section 1C, and the stage 41 is moved by the driving section 42 of the positional adjusting mechanism 4 such that the distal end section 2a of the horn section 2 can be fitted to the first fitting section 7a so that a position is adjusted in the horizontal direction of the coaxial adjusting jig 7.

After the distal end section 2a of the horn section 2 is adjusted to a position at which the distal end section 2a can be fitted to the first fitting section 7a, the horn section 2 is further lowered until an upper end section of the coaxial adjusting jig 7 comes into contact with the attachment section 2b.

At this time, when the distal end section 2a or the outer circumferential surface 2d is likely to rub against the first fitting section 7a, the position in the horizontal direction of the receiving base 3 is finely adjusted such that the horn section 2 is smoothly inserted.

Thus, when the coaxial adjusting jig 7 is sandwiched between the attachment sections 3b and 2b, a movement position of the stage 41 is fixed, and the horn section 2 is moved above the coaxial adjusting jig 7 by driving the moving section 1C.

Also, the coaxial adjusting jig 7 is pulled up and removed from the receiving base 3.

This ends the first adjustment step.

Subsequently, the adjustment thermal caulking step is performed. This step is a process in which the adjusting lens is fixed to the adjusting lens frame by disposing the adjusting lens frame, in which the receiving base 3 of the lens-fixing device 1 after the first adjustment step is performed is equipped with the adjusting lens, moving the horn section 2 in the direction of movement M, and thermally caulking the adjusting lens frame.

To be specific, first, as shown in FIG. 5A, the adjusting lens frame 160, in which the disposition hole section 3a of the receiving base 3 of the lens-fixing device 1 after the first adjustment step is performed is equipped with an adjusting lens 50, is disposed.

The adjusting lens 50 and the adjusting lens frame 160 are members that have exactly the same constitutions as the first lens 5 and the lens frame 16 which are the targets to be fixed, respectively.

The adjusting lens frame 160 is disposed in exactly the same manner as the lens frame 16 which is the target to be fixed. In other words, the adjusting lens frame 160 is placed on the receiving surface 3d while the distal end section 16a is directed upward, the adjusting lens frame 160 is inserted into the disposition hole section 3a from the proximal end surface 6e side, and the outer circumferential surface 6f is internally fitted into the inner circumferential surface 3c.

Subsequently, the horn section 2 is lowered by driving the moving section 1C while at least one of heating and ultrasonic application with respect to the horn section 2 is performed.

When the pressing surface 2c of the horn section 2 comes into contact with the distal end section 16a, the distal end section 16a is heated and thereby softened. Thus, the distal end section 16a is deformed along the pressing surface 2c as the pressing surface 2c is lowered. Therefore, as shown in FIG. 5B, the distal end section 16a comes into close contact with the first lens surface 5a while the distal end section 16a is folded on an outer circumferential section of the first lens surface 5a. At this time, since a pressing force is applied to an outer circumferential section of the adjusting lens 50 via the deformed distal end section 16a, the second lens surface 5b is pressed against a corner, which is formed with the first lens receiving section 6b and the through hole 6c.

Thus, after the caulked section 6a is formed, the lowering of the horn section 2 stops and the heating and the ultrasonic application stops, and thus the caulked section 6a is cured.

After the caulked section 6a is cured, the horn section 2 is raised by driving the moving section 1C. Thus, the pressing surface 2c is spaced apart from the caulked section 6a, and an adjusting assembly 101, in which the adjusting lens 50 is fixed to the adjusting lens frame 60, is formed.

This ends the adjustment thermal caulking step.

Subsequently, the adjustment position-determining step is performed. This step is a process in which eccentricity of the adjusting lens 50, which is fixed to the adjusting lens frame 60, is detected, and relative positions of the receiving base 3 and the horn section 2 in a direction which is perpendicular to the direction of movement M are determined for the purpose of suppressing the eccentricity to be within an allowable range.

In the above-described adjustment thermal caulking step, the outer circumferential section of the adjusting lens 50 is pressed from the horn section 2 via the caulked section 6a. Since the adjusting lens frame 160 is positioned by the disposition hole section 3a coaxially with the central axis O3 of the receiving base 3, when the central axis O3 of the receiving base 3 and the central axis O2 of the horn section 2 are deviated from each other in the radial direction, a balance of a pressing force which is applied to the outer circumferential section of the adjusting lens 50 from the horn section 2 is lost. For this reason, the adjusting lens 50 is moved depending on distribution of the pressing force so that the adjusting lens 50 is eccentrically deviated with respect to the adjusting lens frame 160.

There is a correlation between the eccentricity of the adjusting lens 50 and a relative amount and direction of deviation of the central axes O2 and O3. For example, by performing an experiment in which the eccentricity is measured when the amount of deviation of the central axes O2 and O3 is changed and the thermal caulking is performed, the relative amount and direction of deviation of the central axes O2 and O3 can be estimated from the eccentricity.

Thus, in this step, the eccentricity of the adjusting lens 50 in the adjusting assembly 101 is measured. A method of measuring the eccentricity is not particularly limited, and the eccentricity can be measured by, for example, a transmission eccentricity measuring device 64 shown in FIG. 6.

The transmission eccentricity measuring device 64 includes a fixing base 62 which holds the outer circumferential surface 6f of the adjusting assembly 101 as a reference, a measuring light source 61, and a light receiving sensor 63 which measures an amount of eccentricity.

In order to measure the eccentricity of the adjusting lens 50 by the transmission eccentricity measuring device 64, the adjusting assembly 101 is fixed to the fixing base 62, and measuring light L0 is incident along the central axis O1 of the adjusting lens frame 60 from the measuring light source 61.

Transmitted light L1 in the measuring light L0, i.e., that which is transmitted through the adjusting lens 50, is captured as an image, which is formed depending on the eccentricity, by the light receiving sensor 63. Image processing is performed on the image to calculate the amount and direction of eccentricity are calculated.

After the amount and direction of eccentricity of the adjusting lens 50 are calculated, an amount and a direction of movement in a direction which is perpendicular to the central axis O3 of the receiving base 3 are determined for the purpose of correcting the eccentricity on the basis of a conversion equation, a conversion table, and the like which are experimentally determined in advance.

This ends the adjustment position-determining step.

Subsequently, the second adjustment step is performed. This step is a process in which relative positions of the receiving base 3 and the horn section 2 are adjusted in the direction which is perpendicular to the direction of movement M such that positions of the receiving base 3 and the horn section 2 are at relative positions which are determined in the adjustment position-determining step.

As shown in FIG. 7, the amount and direction of movement of the receiving base 3, which are determined in the adjustment position-determining step, are converted into amounts of movement of the Y-axis moving section 4Y and the X-axis moving section 4X, and positional adjustment is performed on the receiving base 3 by driving the driving section 42 configured to move the Y-axis moving section 4Y and the X-axis moving section 4X.

FIG. 7 shows an example of a case in which, when the amount of movement of the X-axis moving section 4X is Δx, the X-axis moving section 4X is moved by Δx by the driving section 42, but when the Y-axis moving section 4Y needs to be moved, the Y-axis moving section 4Y is also moved together.

This ends the second adjustment step.

Thus, the positional adjustment is performed on the central axis O2 of the horn section 2 and the central axis O3 of the receiving base 3 in the lens-fixing device 1 in a positional relationship in which the eccentricity of the first lens 5 falls in the allowable range when the lens frame 16 which is equipped with the first lens 5 is thermally caulked.

This ends the method of adjusting the lens-fixing device 1 according to this embodiment.

Next, the lens-fixing method according to this embodiment will be described.

The lens-fixing method according to this embodiment is a method in which the lens frame 16, which is equipped with the first lens 5, is thermally caulked using the lens-fixing device 1, in which the relative positions of the receiving base 3 and the horn section 2 are adjusted in the direction which is perpendicular to the direction of movement M in advance, by performing the above-described method of adjusting the lens-fixing device 1 according to this embodiment so that the first lens 5 is fixed to the lens frame 6.

As shown in FIG. 5A and FIG. 5B, the thermal caulking in this method is the same process as the above-described adjustment thermal caulking step except that the first lens 5 and the lens frame 16 are used instead of the adjusting lens 50 and the adjusting lens frame 160.

According to the above-described lens-fixing method, the relative positions of the horn section 2 and the receiving base 3 are adjusted such that the eccentricity can be suppressed depending on the eccentricity of the adjusting lens 50 occurring when the adjusting lens 50 and the adjusting lens frame 160, which have the same constitutions as the first lens 5 and the lens frame 16, are thermally caulked. For this reason, occurrence of the eccentricity can be suppressed.

Note that the relative positions of the horn section 2 and the receiving base 3, which are adjusted by the method of adjusting the lens-fixing device according to this embodiment, are inherent in an assembly state of the lens-fixing device 1 or types of the first lens 5 and the lens frame 16 as long as a change over time is generated in the positional relationship.

Therefore, adjustment using this adjustment method may be performed at a time such as before new kinds of first lens 5 and lens frame 16 are used or after maintenance of the lens-fixing device 1 as necessary.

Thus, the lens frame 16 is thermally caulked to fix the first lens 5 so that an assembly 110 including the first lens 5 and the lens frame 6 is formed.

Subsequently, the second lens 9 is inserted into the assembly 110, and the second lens 9 is fixed to the lens frame 6 using an appropriate means. In this embodiment, the lens lateral surface 9c and the inner circumferential surface 6h of the lens frame 6 arc coated with the adhesive, the adhesive is cured, and the adhesive cured body 10 is formed so that the second lens 9 is fixed.

Thus, the lens unit 100 is manufactured.

As described above, according to the lens-fixing device 1 according to this embodiment, since the positional adjusting mechanism 4 is provided, highly precise adjustment of the relative positions between the horn section 2 and the receiving base 3 in a direction that is perpendicular to the direction of movement of the horn section 2 can be easily and quickly performed.

Also, according to the method of adjusting the lens-fixing device according to this embodiment, since the adjustment thermal caulking step is performed after the first adjustment step is performed, and the adjustment position-determining step and the second adjustment step are further performed, the eccentricity which occurs due to the thermal caulking can be suppressed.

Therefore, according to the lens-fixing method according to this embodiment, the occurrence of the eccentricity can be suppressed even if the fixing is performed by the thermal caulking.

(Second Embodiment)

A lens-fixing device according to a second embodiment of the present invention will be described.

Figure 8:
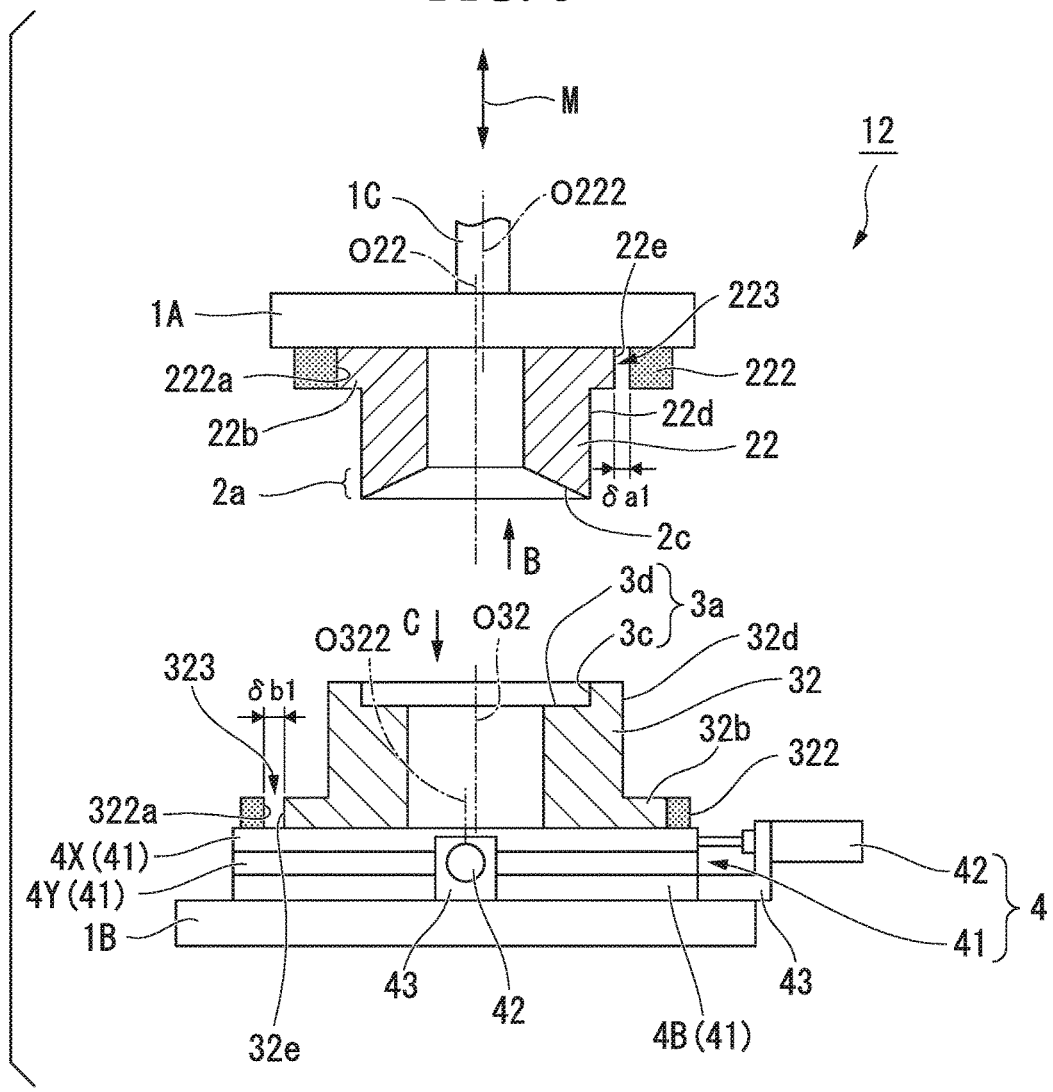
FIG. 8 is a schematic horizontal cross-sectional view showing a constitution of a lens-fixing device according to a second embodiment of the present invention.

FIG. 8 is a schematic horizontal cross-sectional view showing a constitution of the lens-fixing device according to the second embodiment of the present invention.

Figure 9A:
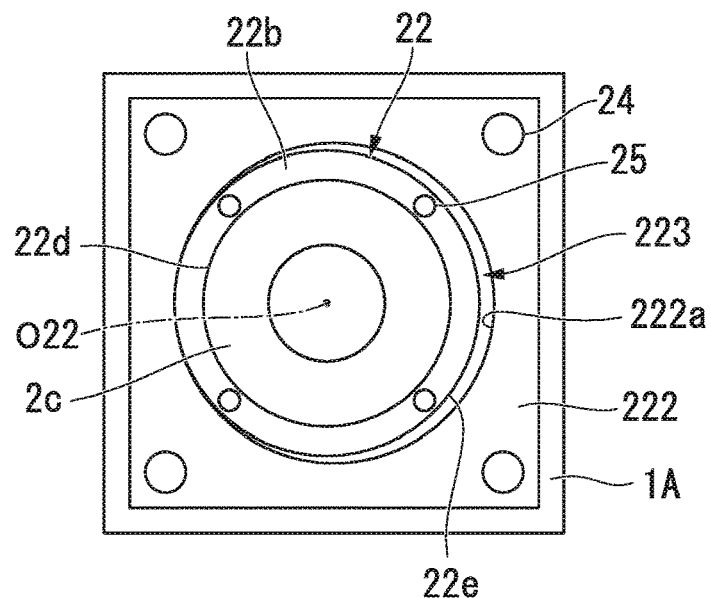
FIG. 9A is a view when viewed in a direction of an arrow B in FIG. 8.
Figure 9B:
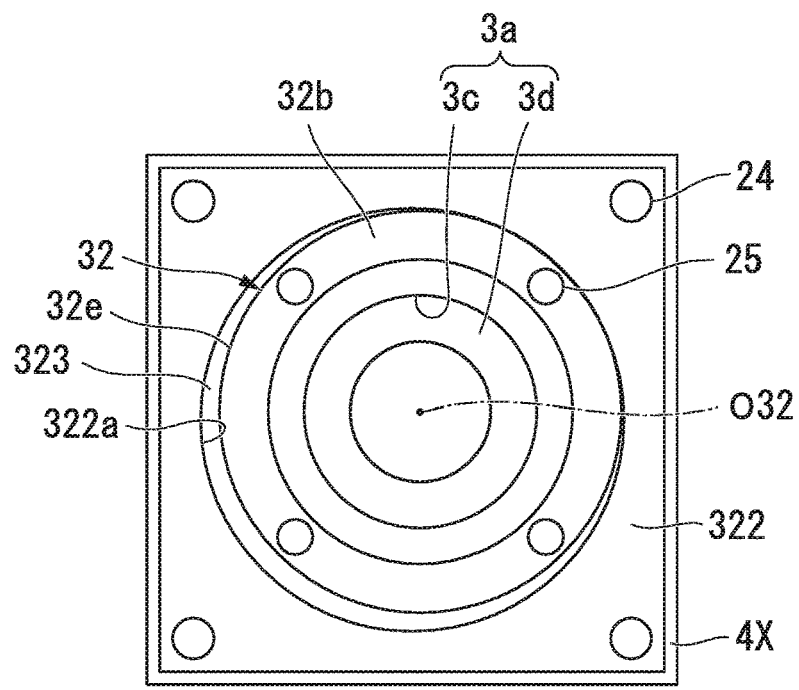
FIG. 9B is a view when viewed in a direction of an arrow C in FIG. 8.

FIGS. 9A and 9B are views when viewed in directions of an arrow B and an arrow C in FIG. 8, respectively.

As shown in FIG. 8, a lens-fixing device 12 according to this embodiment includes a horn section 22 and a receiving base 32 instead of the horn section 2 and the receiving base 3 of the lens-fixing device 1 according to the above-described first embodiment, and further includes an upper fitting member 222 (a second holding section) and a lower fitting member 322 (a first holding section).

Hereinafter, differences from the above-described first embodiment will be mainly described.

The horn section 22 is provided with a fitting section 22b instead of the attachment section 2b of the horn section 2 according to the above-described first embodiment.

The fitting section 22b is a site which is provided in a plate shape, which can be detachably fixed to a first attachment section 1A by fastening members 25 (refer to FIG. 9A) such as, for example, bolts, and which is formed with an outer circumferential surface 22e, which includes a cylindrical surface coaxially with a central axis O22 of a pressing surface 2c, as a lateral surface.

For this reason, the fitting section 22b is provided with through holes (not shown) which are used for insertion of the fastening members 25.

The outer circumferential surface 22e is a positioning surface which is used for positioning of the pressing surface 2c in a radial direction.

Since a lateral surface 22d between a distal end section 2a and the fitting section 22b in the horn section 22 does not require a function as the positioning surface in the radial direction like the outer circumferential surface 2d of the horn section 2, an appropriate shape can be adopted.

The receiving base 32 is provided with a fitting section 32b instead of the attachment section 3b of the receiving base 3 according to the above-described first embodiment.

The fitting section 32b is a site which is provided in a plate shape, which can be detachably fixed to an upper surface of an X-axis moving section 4X of a positional adjusting mechanism 4 by the fastening members 25 (refer to FIG. 9B), and is formed with an outer circumferential surface 32e, which includes a cylindrical surface coaxial with a central axis O32 of an inner circumferential surface 3c, as a lateral surface.

For this reason, the fitting section 32b is provided with through holes (not shown) into which the fastening members 25 are inserted.

The outer circumferential surface 32e is a positioning surface which is used for positioning of the inner circumferential surface 3c in a radial direction.

A lateral surface 32d between a disposition hole section 3a and the fitting section 32b in the receiving base 32 does not have a function as the positioning surface in the radial direction like the outer circumferential surface 3e of the receiving base 3, and an appropriate shape can be adopted.

The upper fitting member 222 is a site which is used to position the horn section 22, which is fixed on the first attachment section 1A, in a direction which is perpendicular to a direction of movement of a moving section 1C.

In this embodiment, as shown in FIG. 9A, a fitting hole 222a including a cylindrical hole, through which the fitting section 22b of the horn section 22 is detachably fitted into a central portion of a flat plate with a rectangular shape in a planar view, passes through the upper fitting member 222.

The upper fitting member 222 is provided with through holes (not shown), into which fastening members 24 such as, for example, bolts, are inserted, at an outer circumferential side of the fitting hole 222a.

The upper fitting member 222 is fixed to the first attachment section 1A by the fastening members 24.

FIG. 9A shows a state in which the upper fitting member 222 is fixed by the four fastening members 24, but this is an example. In addition, disposition positions or the number of the fastening members 24 can be appropriately set.

A material of the upper fitting member 222 is not particularly limited as long as the material is a material which is appropriate for conditions of use of the horn section 22 at a time of thermal caulking such as, for example, an increase in temperature or ultrasonic application. An example of the material of the upper fitting member 222 includes, for example, stainless steel, cemented carbides, and the like. Also, when stainless steel is used, heat treatment may be performed on the stainless steel as necessary.

The lower fitting member 322 is a site which is used to position the receiving base 32, which is fixed to the X-axis moving section 4X, in the direction which is perpendicular to the direction of movement of the moving section 1C.

In this embodiment, as shown in FIG. 9B, a fitting hole 322a including a cylindrical hole, through which the fitting section 32b of the receiving base 32 is detachably fitted into a central portion of a flat plate with a rectangular shape in a planar view, passes through the lower fitting member 322.

The lower fitting member 322 is provided with through holes (not shown), into which the fastening members 24 are inserted, at an outer circumferential side of the fitting hole 322a.

The lower fitting member 322 is fixed to the X-axis moving section 4X by the fastening members 24.

FIG. 9B shows a state in which the lower fitting member 322 is fixed by the four fastening members 24, but this is an example. In addition, disposition positions or the number of the fastening members 24 can be appropriately set.

A material of the lower fitting member 322 is not particularly limited as long as the material is a material which is appropriate for a load which is applied to the receiving base 32 at a time of thermal caulking such as, for example, an increase in temperature or ultrasonic application. An example of the material of the lower fitting member 322 includes, for example, stainless steel, cemented carbides, and the like. Also, when stainless steel is used, heat treatment may be performed on the stainless steel as necessary.

In the lens-fixing device 12 having the above-described constitution, as shown in FIG. 8, the horn section 22 is fixed by the fastening members 25 (refer to FIG. 9A) in a state in which the fitting section 22b is inserted into the fitting hole 222a of the upper fitting member 222 and is positioned in the radial direction.

At this time, when there is a dimensional difference between the fitting hole 222a and the outer circumferential surface 22e, a gap 223 is formed between the fitting hole 222a and the outer circumferential surface 22c.

An inner diameter of the fitting hole 222a and an outer diameter of the outer circumferential surface 22e are set such that a maximum value of the gap 223 is δa1 or less.

Also, in the lens-fixing device 12, the receiving base 32 is fixed by the fastening members 25 (refer to FIG. 9B) in a state in which the fitting section 32b is inserted into the fitting hole 322a of the lower fitting member 322 and is positioned in the radial direction.

At this time, when there is a dimensional difference between the fitting hole 322a and the outer circumferential surface 32e, a gap 323 is formed between the fitting hole 322a and the outer circumferential surface 32e.

An inner diameter of the fitting hole 322a and an outer diameter of the outer circumferential surface 32e are set such that a maximum value of the gap 323 is δb1 or less.

In order to perform a lens-fixing method according to this embodiment, using the lens-fixing device 12 having the above-described constitution, relative positions between the horn section 22 and the receiving base 32 are adjusted by performing a method of adjusting the lens-fixing device according to this embodiment, before the thermal caulking is performed using a first lens 5 serving as a target to be fixed.

Thus, first, differences of the method of adjusting the lens-fixing device according to this embodiment from the above-described first embodiment will be mainly described.

Figure 10:
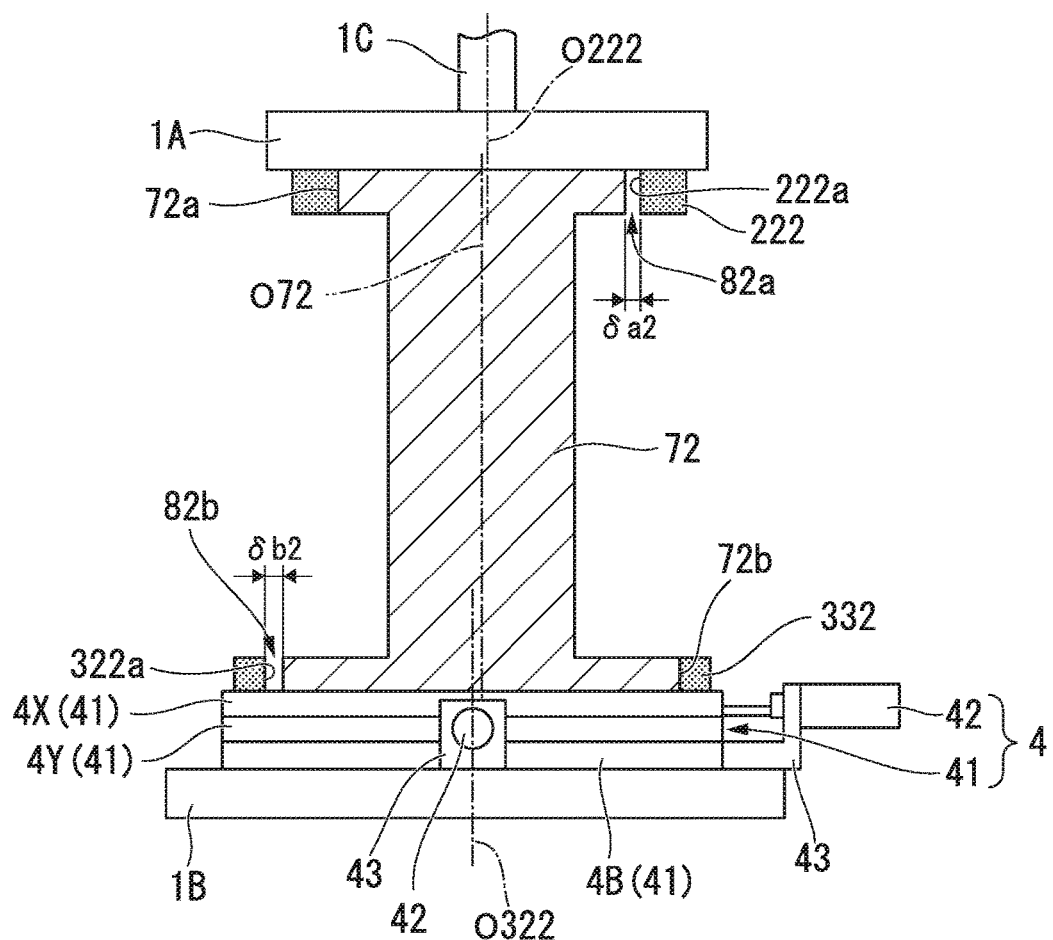
FIG. 10 is a diagram showing a process of a first adjustment step in a method of adjusting the lens-fixing device according to a second embodiment of the present invention.

FIG. 10 is a diagram showing a process of a first adjustment step in the method of adjusting the lens-fixing device according to the second embodiment of the present invention.

The method of adjusting the lens-fixing device according to this embodiment is a method in which the first adjustment step, an adjustment thermal caulking step, an adjustment position-determining step, and a second adjustment step are sequentially performed.

The first adjustment step according to this embodiment is a process in which positions of the central axis O22 of the horn section 22 and the central axis O32 of the receiving base 32 are caused to be substantially aligned in a direction which is perpendicular to a direction of movement M of the horn section 22 at the time of thermal caulking. Here, a range of the expression "caused to be substantially aligned" is the same as in the above-described first embodiment.

A method of substantially aligning the central axes O22 and O32 is not particularly limited. In this embodiment, the upper fitting member 222 and the lower fitting member 322 are provided. Thus, as shown in FIG. 10, a method of performing positional adjustment on the upper fitting member 222 and the lower fitting member 322 in the radial direction through fitting using a coaxial adjusting jig 72 is adopted as an example.

The coaxial adjusting jig 72 is a shaft shape member, one end section of which is formed with a first fitting section 72a including a circular plate, which is detachably internally fitted into the fitting hole 222a of the upper fitting member 222, and the other end section of which is formed with a second fitting section 72b including a circular plate, which is detachably internally fitted into the fitting hole 322a of the lower fitting member 322, at a position which is coaxial with a central axis O72 of the first fitting section 72a.

A length of the coaxial adjusting jig 72 is set such that a distance between the first attachment section 1A and the X-axis moving section 4X is a distance at the time of thermal caulking in a state in which the first fitting section 72a and the second fitting section 72b are internally fitted into the fitting hole 222a and the fitting hole 322a, respectively. Thus, even if the central axis O22 is inclined with respect to the central axis O32, an amount of positional deviation of the pressing surface 2c in the radial direction at the time of thermal caulking can be suppressed to a given value or less.

Outer diameter dimensions of the first fitting section 72a and the second fitting section 72b are determined on the basis of an allowable value which is necessary to substantially align a central axis O222 of the fitting hole 222a of the upper fitting member 222 and a central axis O322 of the fitting hole 322a of the lower fitting member 322.

For example, a maximum value of a gap 82a between the first fitting section 72a and the fitting hole 222a is set to δa2, a maximum value of a gap 82b between the second fitting section 72b and the fitting hole 322a is set to δb2, and coaxiality of the first fitting section 72a and the second fitting section 72b is set to 0. In this case, amounts of positional deviation of the central axes O222 and O322 in the radial direction can be suppressed to (δa2+δb2)/2 or less.

In order to perform the positional adjustment on the central axes O22 and O32 using the coaxial adjusting jig 72, the first attachment section 1A is sufficiently spaced apart from the positional adjusting mechanism 4 in a state in which the horn section 22 and the receiving base 32 are removed.

Also, the second fitting section 72b of the coaxial adjusting jig 72 is fitted into the fitting hole 322a of the lower fitting member 322, and the coaxial adjusting jig 72 is placed on the X-axis moving section 4X.

Subsequently, the first attachment section 1A is lowered by driving the moving section 1C, and a stage 41 is moved by a driving section 42 of the positional adjusting mechanism 4 and a position in a horizontal direction of the coaxial adjusting jig 72 is adjusted such that the fitting hole 222a of the upper fitting member 222 can be fitted to the first fitting section 72a of the coaxial adjusting jig 72.

After the first fitting section 72a is adjusted to a position at which the first fitting section 72a can be fitted to the fitting hole 222a of the upper fitting member 222, the first attachment section 1A is further lowered until an upper end section of the coaxial adjusting jig 72 comes into contact with the first attachment section 1A (refer to FIG. 10).

Thus, when the coaxial adjusting jig 72 is sandwiched between the X-axis moving section 4X and the first attachment section 1A, a movement position of the stage 41 is fixed and the moving section 1C is driven so that the first attachment section 1A is moved above the coaxial adjusting jig 72.

Also, the coaxial adjusting jig 72 is pulled up and removed from the lower fitting member 322.

Subsequently, the fitting section 32b of the receiving base 32 is fitted into the fitting hole 322a such that the receiving base 32 is positioned in the radial direction and the receiving base 32 is fixed to the X-axis moving section 4X by the fastening members 25.

Also, the fitting section 22b of the horn section 22 is fitted into the fitting hole 222a such that the horn section 22 is positioned in the radial direction and the horn section 22 is fixed to the first attachment section 1A by the fastening members 25.

Thus, amounts of positional deviation of the central axes O22 and O32 in the radial direction are suppressed to (Δa1+δa2+δb1+δb2)/2 or less.

This ends the first adjustment step according to this embodiment.

In the first adjustment step according to this embodiment, after the coaxiality between the upper fitting member 222 and the lower fitting member 322 is set to a given value or less by the coaxial adjusting jig 72, the horn section 22 and the receiving base 32 are attached through the fitting.

For this reason, when a type of the first lens 5 or the lens frame 16 is changed after the second adjustment step ends, if the horn section or the receiving base is exchanged with another horn section or another receiving base having the fitting section 22b or 32b with a similar shape, predetermined coaxiality is maintained. Thus, positional adjustment between a new horn section and a new receiving base can be omitted. For this reason, the time that is required for a setup change when replacement is performed in manufacturing lens units of different types can be shortened.

Subsequently, the adjustment thermal caulking step, the adjustment position-determining step, and the second adjustment step according to this embodiment are performed. These steps are the same as those of the above-described first embodiment except that the lens-fixing device 12 is used instead of the lens-fixing device 1.

The lens-fixing method after the lens-fixing device 12 is adjusted by the method of adjusting the lens-fixing device according to this embodiment is also the same as that of the above-described first embodiment except that the lens-fixing device 12 is used instead of the lens-fixing device 1.

As described above, according to the lens-fixing device 12 according to this embodiment, since the positional adjusting mechanism 4 is provided, highly precise adjustment in the relative positions between the horn section 22 and the receiving base 32 in the direction that is perpendicular to the direction of movement of the horn section 22 can be easily and quickly performed.

According to the method of adjusting the lens-fixing device according to this embodiment, the eccentricity which occurs due to the thermal caulking can be suppressed as in the above-described first embodiment.

Therefore, according to the lens-fixing method according to this embodiment, even if the lens is fixed by the thermal caulking, the occurrence of the eccentricity can be suppressed.

Particularly, in this embodiment, since the horn section 22 and the receiving base 32 are easily exchanged while the relative positions of the horn section 22 and the receiving base 32 are constantly maintained, even if the horn section 22 and the receiving base 32 are exchanged, a time which is required for a setup change can be reduced, and thus the lens unit 100 can be effectively manufactured.

Note that, although examples of cases in which the caulked section 6a is formed over the entire circumference of the outer edge of the first lens 5 have been described in the description of the above-described embodiments, the plurality of caulked sections 6a which are spaced apart from each other in the circumferential direction may be formed.

The examples of the cases in which the lens frame 16 is fitted into the disposition hole section 3a which is provided at the upper end of the receiving base so that the lens frame 16 is positioned in the radial direction have been described in the description of the above-described embodiments, but the disposition hole section 3a can be replaced with, for example, a chuck mechanism or the like. In this case, the lens frame 16 can be held at a chuck center of the chuck mechanism so that an arrangement error due to fitting backlash can be suppressed.

The examples of the cases in which the direction of movement of the moving section 1C is a direction of one axis which coincides with a vertical direction have been described in the description of the above-described embodiments, but these cases are examples. The direction of movement of the moving section 1C is not limited thereto. For example, the direction of movement of the moving section 1C may be a direction of one axis which intersects the vertical direction.

The examples of the cases in which the horn section is moved in a direction of one axis, and the receiving base is movably held in a direction which intersects the direction of the one axis have been described in the description of the above-described embodiments, but such movement may be performed as relative movement.

For example, the receiving base may be moved in a direction of one axis, and the horn section may be movably held in the direction that is perpendicular to the direction of the one axis.

Both of the horn section and the receiving base can be moved in a direction of one axis and can be movably held in the direction that is perpendicular to the direction of the one axis.

The examples of the cases in which the upper fitting member 222 (the lower fitting member 322) can be independently attached or detached to the horn section 22 (the receiving base 32) have been described in the description of the above-described second embodiment, but the present invention is not limited to such a constitution.

For example, the upper fitting member 222 (the lower fitting member 322) is provided with a fitting hole which is used to detachably fit the horn section 22 (the receiving base 32), and the horn section 22 (the receiving base 32) can be attached to or detached from the upper fitting member 222 (the lower fitting member 322) which is fixed to the first attachment section 1A (the X-axis moving section 4X) in advance.

The upper fitting member 222 (the lower fitting member 322) is not necessarily detachably attached to the first attachment section 1A (the X-axis moving section 4X), and can also be integrally formed with the first attachment section 1A (the X-axis moving section 4X).

In the description of the above-described embodiments, the examples of the cases in which the cylindrical shaft section and the cylindrical hole section are fitted to be positioned have been described with regard to the positioning in the radial direction, but as long as the positioning in the radial direction is possible, positioning using fitting or abutment of a shape other than the cylindrical shape can also be adopted.

The examples of the cases in which the lens frame 16 before the second lens 9 is fixed is thermally caulked to fix the first lens 5 in the description of the above-described embodiments, but the thermal caulking may be performed using the lens frame 16 in which the second lens 9 is fixed when a fixed state of the second lens 9 is not affected by the thermal caulking.

In the description of the above-described embodiments, when the positional relationships of the members or the sites are described as coaxial with a specific axis, a size of the allowable amount of positional deviation or the like is described under the assumption that the coaxiality is zero. However, there are actually cases in which the coaxiality is not zero due to a manufacturing error or the like. In such cases, the actually allowable amount of positional deviation or the like may be a value obtained by subtracting an assumed error.

All elements described in the above-described embodiments and modified examples can be implemented through appropriate combination or deletion within the technical idea of the present invention. The present invention is not limited by the above description, and is only limited by the appended claims.

What is claimed is:

1. A lens-fixing device in which thermal caulking is performed on a lens frame to fix a lens to the lens frame, the lens-fixing device comprising:
    a receiving base on which the lens frame equipped with the lens is disposed;
    a horn section which is disposed at a position opposite to the receiving base, the horn section being configured to press and deform an end section of the lens frame while the lens frame disposed on the receiving base is heated;
    a moving section configured to move at least one of the receiving base and the horn section in a direction of an axis for performing the thermal caulking; and
    a positional adjusting section configured to adjust relative positions of the receiving base and the horn section in a direction which is perpendicular to the direction of the axis by moving at least one of the receiving base and the horn section in the direction which is perpendicular to the direction of the axis,
    wherein the receiving base and the horn section are configured to be fitted to a coaxial adjusting jig having a first fitting section and a second fitting section, the first fitting section and the second fitting section being configured to be fitted to the horn section and the receiving base, respectively.

2. The lens-fixing device according to claim 1, further comprising:
    a first holding section which is provided at the moving section or the positional adjusting section, the first holding section being configured to position the receiving base in the direction which is perpendicular to the direction of the axis and detachably hold the receiving base; and
    a second holding section which is provided at the moving section or the positional adjusting section, the second holding section being configured to position the horn section in the direction which is perpendicular to the direction of the axis and detachably hold the horn section.

3. A method of adjusting a lens-fixing device, the lens-fixing device being configured to fix a lens to a lens frame by moving a horn section in a direction of an axis toward the lens frame which is equipped with the lens disposed at a receiving base and performing thermal caulking on an end section of the lens frame, the method of adjusting the lens-fixing device comprising:
- a first adjustment step of causing a position of a central axis of the horn section and a position of a central axis of the receiving base to be substantially aligned in a direction which is perpendicular to the direction of the axis by performing fitting using a coaxial adjusting jig having a first fitting section and a second fitting section, the first fitting section and the second fitting section being configured to be fitted to the horn section and the receiving base, respectively;
- an adjustment thermal caulking step of disposing an adjusting lens frame equipped with an adjusting lens at the receiving base of the lens-fixing device after the first adjustment step is performed, moving the horn section in the direction of the axis, and fixing the adjusting lens to the adjusting lens frame by performing thermal caulking on the adjusting lens frame;
- an adjustment position-determining step of detecting eccentricity of the adjusting lens which is fixed to the adjusting lens frame, and determining relative positions of the receiving base and the horn section in the direction which is perpendicular to the direction of the axis for suppressing the eccentricity in an allowable range; and
- a second adjustment step of adjusting the relative positions of the receiving base and the horn section in the direction which is perpendicular to the direction of the axis such that the relative positions which are determined in the adjustment position-determining step are accomplished.

4. A lens-fixing method comprising:
fixing the lens to the lens frame by performing thermal caulking on the lens frame equipped with the lens using the lens-fixing device in which the relative positions of the receiving base and the horn section in the direction which is perpendicular to the direction of the axis are adjusted in advance by performing the method of adjusting the lens-fixing device according to claim 3.

* * * * *